Aug. 20, 1946.   E. H. LANGE   2,406,082
ELECTRONIC FREQUENCY-CONTROL DEVICE
Filed Oct. 30, 1943   3 Sheets-Sheet 3
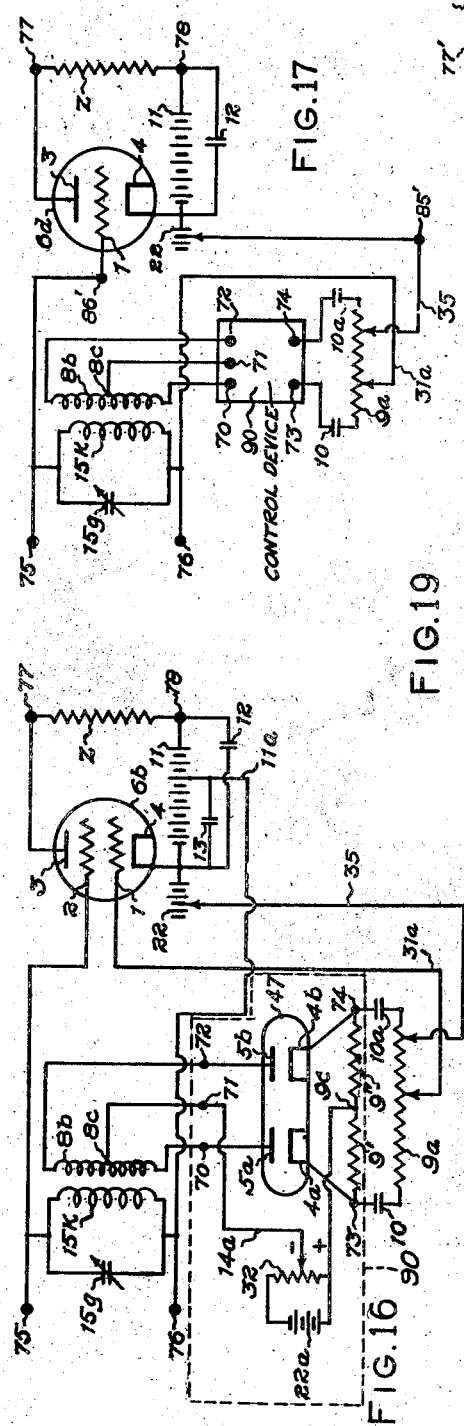
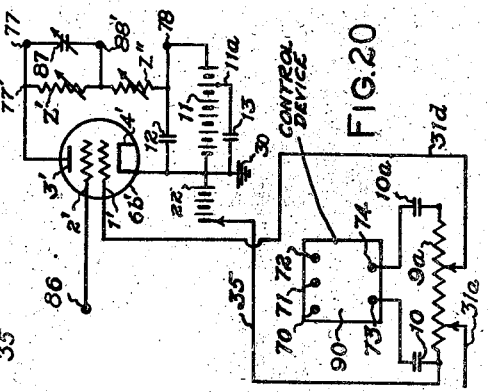
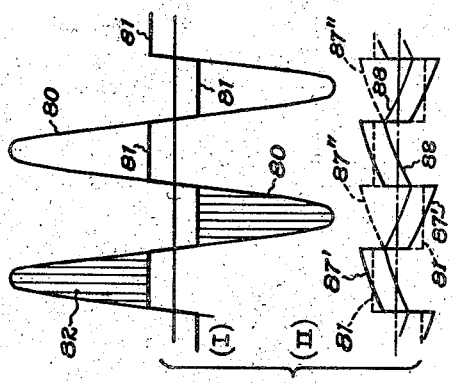
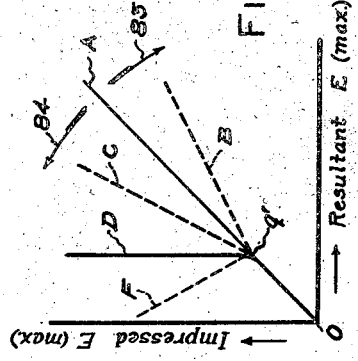
Edward H. Lange.
INVENTOR.

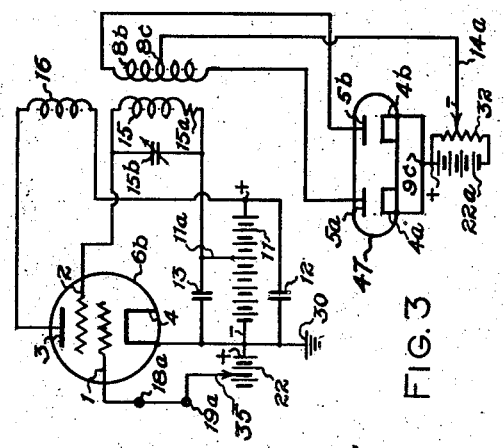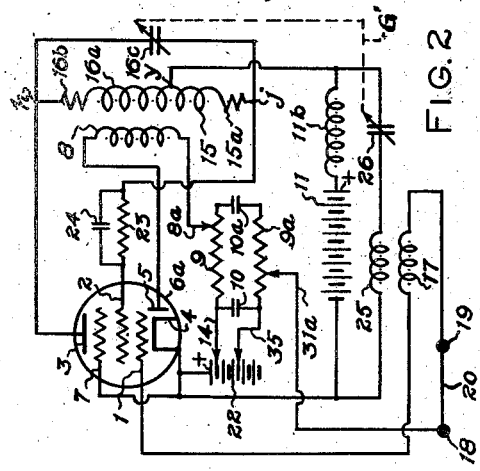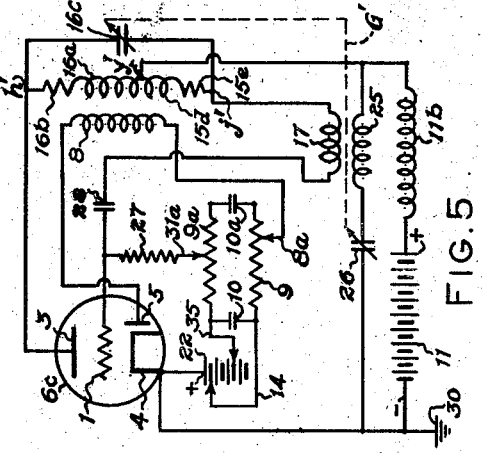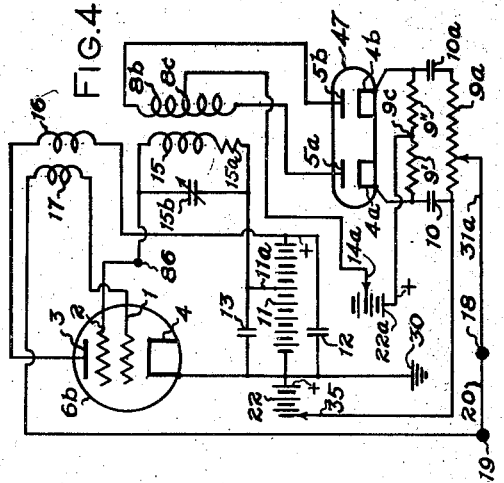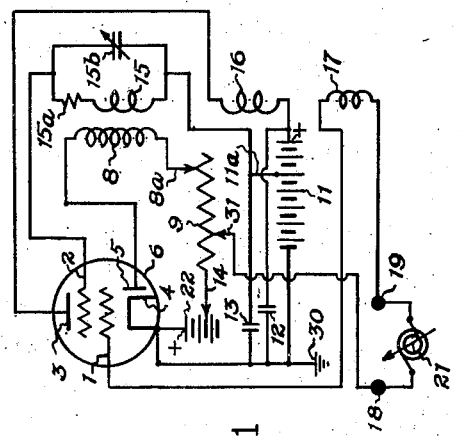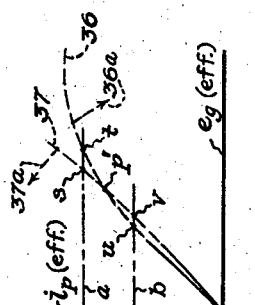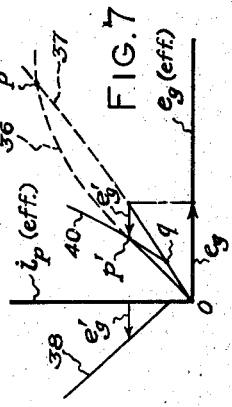

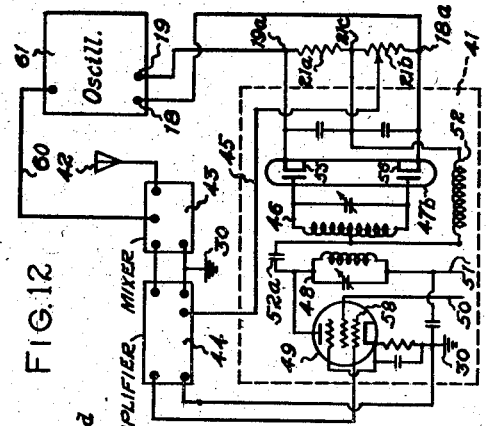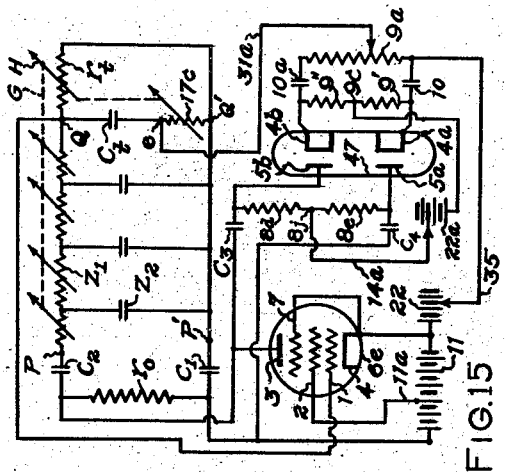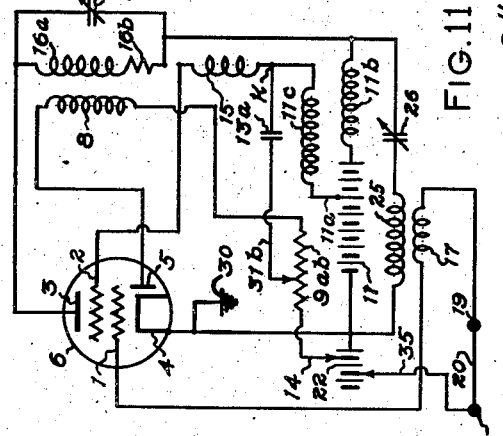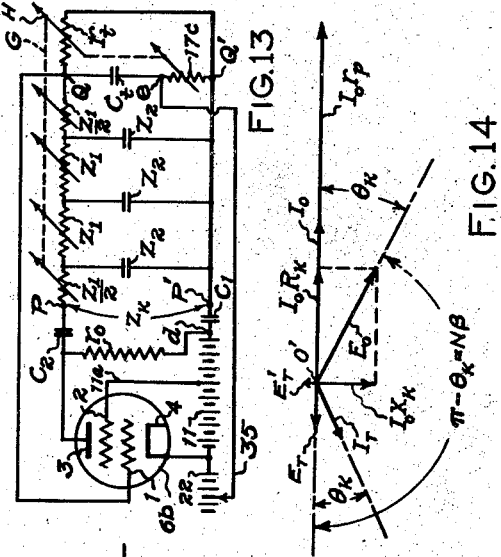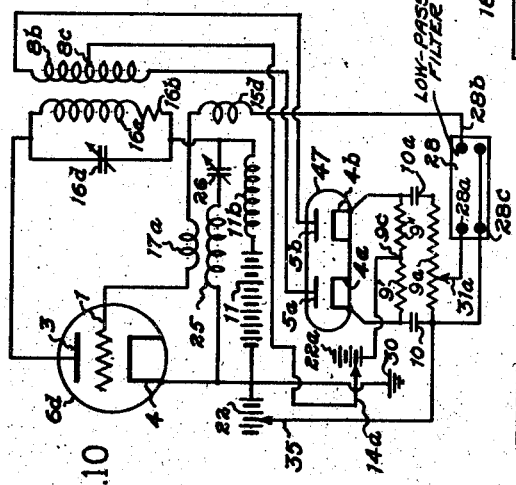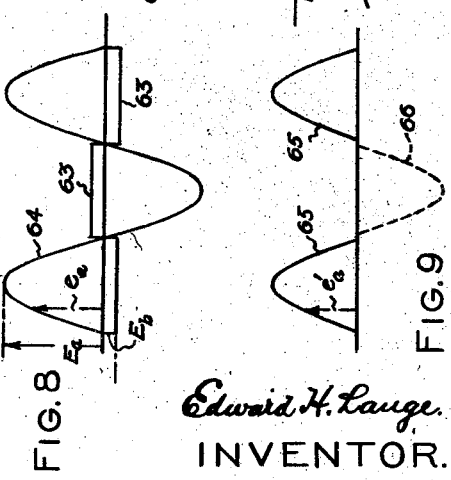
Edward H. Lange
INVENTOR.

Patented Aug. 20, 1946

2,406,082

UNITED STATES PATENT OFFICE 2,406,082

ELECTRONIC FREQUENCY-CONTROL DEVICE

Edward H. Lange, Baltimore, Md.

Application October 30, 1943, Serial No. 508,367

17 Claims. (Cl. 250—36)

This invention pertains to electronic control devices for voltage-frequency intercontrol, and more particularly to devices for securing a high degree of frequency-stability and wave-form control, for production of either substantially pure sine-waves or waves rich in harmonics such as rectangular or saw-tooth waves, with a high degree of frequency-stability, over a range of low or audio and super-audio frequencies, or over a range of high or radio-frequencies, with frequency-stability substantially independent of variations of thermionic tube resistance and network resistance over the high frequency range, and independent of thermionic tube resistance over the low frequency range; for providing simple thermionic means determining a resultant output-voltage as to maximum-voltage and wave-form from sinusoidal input-voltages, and controlling the characteristics of the output-voltages with facility over a wide range of modifications of these characteristics, including the limiting of the output-voltages to a constant value, independent of increases in value of the input-voltages.

An object of this invention is to provide simple thermionic means for improving the frequency-stability of thermionic generators of alternating currents, and for controlling wave-form and constituent harmonics of these alternating currents.

Another object of this invention is to provide a novel phase-balancing or normalizing device for resistance-capacitance type oscillators, for balancing the quadrature-component of cathode-anode voltage relative to cathode-anode alternating current, together with simple thermionic means for increasing the effectiveness of balance by restricting the wave-form of generated alternating currents to substantially pure sine-waves, to attain a high degree of frequency-stability, in the low or audio and super-audio frequency range.

Still another object of this invention is to provide simple means whereby the generators so stabilized, can have the generated frequency also controlled or modulated by voltage-control means, without the necessity of a separate reactance-modulator tube and circuit.

A fourth object of this invention is to provide a simple device for controlling the amplitude and harmonic constituents of an alternating output-voltage in relation to sinusoidal input-voltages, including the limiting of the amplitude of the output-voltage to a constant value independent of large increases in amplitude of the input-voltage.

A fifth object of this invention is to provide a thermionic device for generating rectangular waves or saw-tooth waves with a high degree of frequency stability, substantially independent of thermionic tube-resistance, and for controlling the wave-form of such generated waves.

A sixth object of this invention is to provide simple means for generating such rectangular, saw-tooth, or other irregular shape waves in the high or radio-frequency range as well as in the low or audio-frequency range, and to provide voltage-control means whereby the frequency of such generated waves can be readily controlled or modulated, without change of wave-shape.

These objects, and others hereafter noted, will be better understood by reference to the accompanying drawings, and to the appended claims.

Referring to the drawings,

Fig. 1 shows a fundamental-frequency phase-balanced thermionic alternating current generator, with a thermionic voltage-control device for suppressing harmonics by feeding back upon a control-grid voltages opposing the oscillation-sustaining voltages, after a selected magnitude of the oscillation-sustaining voltages has been reached; the generator having means for modulating the fundamental generated frequency, responsive with changes in bias-voltage upon the control-grid.

Fig. 2 illustrates a modification of Fig. 1, a Hartley-type oscillating circuit being employed for the oscillator, the thermionic voltage-control device having parallel-impedance for feeding back the threshold-determined oscillation-opposing voltages, permitting different bias voltages for the constant bias of the voltage-control device and for the control-grid; also having a modified form of phase-balancing impedance.

Fig. 3 illustrates a thermionic generator, with a voltage-control device employing a double-diode, controlling the feed-back voltage, after a selectable magnitude of feed-back voltage has been reached.

Fig. 4 illustrates a modification of Fig. 3, containing phase-balancing impedances, and a parallel-impedance circuit connected with the voltage-control device, for applying threshold-determined oscillation opposing voltages, and permitting different bias upon the voltage-control device and upon a grid of the thermionic generator.

Fig. 5 illustrates a thermionic alternating current generator having a Hartley-type circuit with a triode, and having a voltage-control device with a parallel-impedance circuit, permitting different bias voltages for said device and upon the triode-grid, and having impedance means for phase-balancing.

Fig. 6 illustrates in graph form, a characteristic of required effective-value of voltage upon a grid-control element to produce a particular effective-value of alternating current through cathode-anode, and associated network; also a superposed characteristic of available feed-back voltage for producing self-sustained oscillations, in relation to the same effective-values of cathode-anode alternating currents, and certain relations pertaining to conventional types of oscillators.

Fig. 7 illustrates in graph form, the same characteristics illustrated in Fig. 6, and, in addition, illustrates the manner in which the feed-back characteristic can be modified by means of the devices of this invention, in reference to a threshold value of voltage, and for determining an equilibrium operating voltage within the range of voltages in which substantially pure sine waves of cathode-anode current are produced.

Fig. 8 illustrates a sinusoidal impressed voltage upon a voltage-control device of this invention, also the effect of the constant bias-voltage of this device.

Fig. 9 illustrates a resultant voltage, for example with reference to Fig. 8, and for use in proportioning a threshold-determined oscillation-opposing voltage, upon a generator of this invention.

Fig. 10 illustrates a tuned plate type alternating current generator, having a triode, phase-balancing impedances, and a double-diode type voltage-control device for suppressing harmonic frequencies, and stabilizing the fundamental generated frequency.

Fig. 11 illustrates a thermionic alternating current generator having phase-balancing impedances, a voltage-control device, and bias-control means for controlling or modulating the fundamental generated frequency, this generator differing from others above noted, in that both the feed-back voltages and the threshold-determined feedback-opposing voltages are applied to a screen-grid, leaving the control-grid free for phase-balancing voltages, and frequency modulating purposes.

Fig. 12 illustrates an application of the generators of this invention for purposes of frequency-mixing, and in particular the modification of a difference-frequency by means of a bias-voltage produced by a conventional demodulator, applied to one of the generators of this invention.

Fig. 13 illustrates a thermionic alternating current generator particularly suitable for low frequencies, that is, for audible or super-audible frequencies, and having novel fundamental-frequency phase-balancing means.

Fig. 14 illustrates a vector-diagram for the generator of Figs. 13 and 15, and shows certain important relationships employed in compensating the quadrature-component of cathode-anode voltage relative to the cathode-anode alternating current.

Fig. 15 illustrates the generator of Fig. 13, with a double-diode type voltage-control device, for suppressing harmonic frequencies, and for improving the frequency-stability of the generator.

Fig. 16 illustrates a thermionic voltage-control device having a double-diode, and connections to a screen-grid, control-grid, cathode, and anode, for controlling alternating currents.

Fig. 17 illustrates a double-diode type thermionic voltage-control device; also connections of such a device to a triode.

Fig. 18 illustrates in graphic form various characteristics of resultant output-voltage in relation to input-voltage, as effected by the ratio of input-voltage to superposed threshold-determined voltage from the thermionic voltage-control device, and by the relative phase of the superposed voltage, either degenerative or regenerative.

Fig. 19 (I) illustrates an impressed sinusoidal input-voltage and a corresponding amplitude-limited resultant voltage, obtainable from the thermionic voltage-control device, for example, as in Fig. 17. Fig. 19 (II) illustrates certain rectangular and saw-tooth waves, and combinations, obtainable from the thermionic tube connections Fig. 20, to the thermionic voltage-control device, and to a previously described thermionic alternating current generator.

Fig. 20 illustrates a thermionic tube with output-impedances for producing rectangular and saw-tooth voltage waves, and input-connections to grid-control means, including connections to one of the types of thermionic generator previously noted, and to the double-diode type of voltage-control device of said generator.

In prior art, methods have been devised for maintaining the feed-back voltage of generators employing thermionic tubes in substantial phase-opposition to cathode-anode alternating currents, so that variations of tube resistance or resistance of a phase-shifting network are to a large extent compensated; for example, Method and means for normalizing thermionic oscillators, U. S. Patent No. 2,305,362, of the present inventor. These processes, for improving the frequency-stability of thermionic generators, involve only phase-balancing for the fundamental generated frequency, and employ a fundamental-frequency quadrature-phase voltage in quadrature with the cathode-anode alternating currents; when the voltages execute large swings as is always the case when the current equilibrium is brought about in the conventional manner, and curvatures of the characteristics of the tube are involved as well as cut-off of anode current for a part of a cycle, then harmonic amplitudes are present to a large degree, and phase-balancing of the fundamental-frequency alone, cannot eliminate all undesirable phase angles. The effect of these harmonics in disturbing the balance maintained for the fundamental generated frequency, by the normalizing or phase-balancing methods mentioned, can be visualized from the resultant reactance for the network connected with the cathode-anode, which can be expressed as follows:

$$X_1 + \frac{X_3}{3}(I_3/I_1)^2 + \ldots \frac{X_n}{n}(I_n/I_1)^2$$

in which $X_1$ is the equivalent series reactance of the network at the natural resonant frequency or fundamental generated frequency of the phase-balanced or normalized oscillator, $X_3$ the reactance of the network for the third harmonic, and in general, $X_n$ the reactance of the network for the $n$th odd harmonic; also $I_3/I_1$ is the ratio of third harmonic amplitude to fundamental amplitude, and in general $I_n/I_1$ is the ratio of amplitude of $n$th odd harmonic to fundamental amplitude. The reactance $X_1$ is normally compensated, in its undesired effects in combination with resistance variations of tube or network in modifying generated frequency, by the phase-balancing or normalizing process above referred to, however, the disturbing effect of the remainder upon the generated frequency is apparent, especially in view of modifications of the harmonic constituent ratios, by modification of tube parameters, cathode-anode voltage, etc.

An important feature of this invention, is the simple means for determining an equilibrium of the generated alternating current, after a threshold-value of feed-back voltage of selectable amount has been reached, and for substantially eliminating the undesired effects of harmonic amplitudes, in contributing to frequency-instability of the generated fundamental frequency.

Methods have heretofore been employed to secure a substantial tangency or coincidence between the lower portions of the dynamic characteristic and the feed-back voltage characteristic, by increasing the negative bias upon the grid used for feed-back voltage, thus moving one of these characteristics relative to the other, to secure near coincidence of the lower portions of the characteristics, through the use of rectifiers, creating a substantially steady bias of unidirectional voltage responsive to voltage. Such a system has certain defects which operate against frequency-stability, and which are overcome in the means for determining the equilibrium current, of this invention. Among the defects referred to, are the resort to variation of one of the tube parameters. Thus, the grid upon which feed-back voltage is applied is biased more and more negatively, modifying the effective amplification-factor for the grid. The dependence of effective interelectrode capacitance upon amplification-factor is well known, and the system above-referred to introduces undesired modifications of the tuned circuit. Further, in order for oscillations to be positively maintained, the dynamic characteristic must operate at some curvature in such a system, to provide an equilibrium point, since both characteristics stem from the same origin, as will be apparent from Fig. 6, Fig. 7, discussed in further detail hereafter. In such a system instantaneous voltages are not employed for degenerative feed-back above a threshold value, only a unidirectional bias being used, and such bias is only obtainable from rectified currents passing impedance which is substantially pure reactance at the fundamental and harmonic frequencies, since this latter is essential to providing the time-constant of the impedance sufficiently large to smooth out instantaneous current values to yield a steady unidirectional bias voltage. No constant externally applied bias voltage is employed to bias the rectifier anode from the rectifier cathode, nor for threshold-voltage determination, a variable unidirectional bias being created by rectification, as above noted, in such a system.

An important feature of the present invention, is the utilization of instantaneous voltages, of one or both polarities, the complete absence of current-created bias voltage, and the employment of a constant bias, for determining a threshold-value beyond which instantaneous values of degenerative voltage are impressed upon the grid to which the self-sustaining feed-back voltages are applied.

Also, by means of the voltage-control device of this invention, wave-form can be controlled in a simple manner, also voltages can be limited, and the voltage-control device can be employed to do double duty, for improvement of frequency-stability by harmonic suppression and for evolving rectangular or saw-tooth waves from the frequency-stabilized simple-harmonic waves so produced.

An important feature of the voltage-control device of this invention, is the simple means employed permitting separate and distinct values of voltage-bias to be utilized upon the diode or diodes, and upon the grid control-element to which the device is connected.

These features, and others, will be better understood from the following description, and with reference to the accompanying drawings.

Referring to Fig. 1, at 6 is a thermionic tube, having a cathode 4, anode 3, control-grid 1, screen-grid 2, and diode-anode 5. A tuned-grid oscillator is provided by the tuned circuit 15—15a—15b, having the coil 15 with resistance 15a shunted by variable condenser 15b, connected from screen-grid 2 to a positive potential upon the source 11 of continuous voltage, by connector 11a, and having a coil 16 connected between the anode 3 and a positive potential upon source 11, greater than the positive potential upon 11a; the coil 16 having mutual inductance with 15, and the negative terminal of the source 11 being connected to the cathode 4. At 8, is an inductance coil, coupled with 15, one terminal of 8 being connected to the diode-anode 5, the other terminal 8 being connected through the variable contactor 8a to resistance 9. One terminal of resistance 9 is connected through the variable contactor 14 to the bias-voltage source 22, and so that a negative potential is applied to 14, the positive terminal of the bias-voltage source 22 being connected directly to the cathode 4. An adjustable constant negative potential is thus applied to the diode-anode 5. Coupled with 16, is the compensating coil 17, one terminal of which is connected to the control-grid 1, the other terminal being connected to the terminal 19. Terminal 18, is connected with terminal 19, through the variable-voltage source 21, and terminal 18 is connected with variable-contactor 31 upon resistance 9. The variable-voltage source indicated by 21 is understood to be for modifying the resultant negative bias-voltage upon the control-grid 1, and corresponding amplification factor for the control-grid, to control the corresponding quadrature components of cathode-anode alternating current; it will be understood that such variable voltages can be provided by a variety of well known means, for example by the output-connections of a frequency demodulator or discriminator, or by the output-connections of electro-acoustic devices. At 12 and 13 are by-pass condensers, respectively for by-passing the source 11, or the part of source 11 between 11a and the cathode 4. The phase of instantaneous voltages upon resistance 9, between 31 and 14, is such as to apply degenerative voltages upon control-grid 1, and also the phase of voltages set up in the compensating coil 17, is in quadrature with the cathode-anode alternating currents through 16, and the magnitude and polarity of alternating voltage set up in 17 and impressed upon 1 adjusted to compensate the resultant quadrature component of voltage of the cathode-anode circuit at the natural resonant frequency, and relative to the cathode-anode alternating current. Operation of the circuit of Fig. 1, will be discussed in further detail after other structures herein have been described.

Referring to Fig. 2, the thermionic tube 6a, has a cathode 4, anode 3, diode-anode 5, control-grid 1, screen-grid 2, and suppressor-grid 7. A resonant circuit containing the inductance coil 16a with resistance 16b, in series with inductance coil 15 with resistance 15a, and the variable condenser 16c shunted across these coils and resistances in series, is connected to the thermionic tube to form a Hartley-type oscillator. The junction y of the inductance coils, is connected to the source 11 through the high-reactance choke-coil 11b, the coil 11b being connected to the positive terminal of source 11, and the negative terminal of source 11 being connected to the cathode 4. The terminal h of resistance 16b, is connected to anode 3, and the terminal j of resistance 15a is connected to the screen-grid 2, through voltage-reducing resistance 23 and by-pass condenser 24 shunted across 23. The resistances 15a and 16b each include resistance inherent in the respective coils 15 and 16a. Shunted across the choke-coil 11b and source 11, are the inductance 25 and variable condenser 26, in series. At 9, 9a, 10, 10a, 14, 35, is a transfer-impedance having pure resistances 9 and 9a, and stopping condensers 10 and 10a, the stopping condensers being of such capacity that the reactance of these condensers for the fundamental generated frequency, and all harmonic frequencies, is infinitesimal in comparison with the magnitude of resistance of 9 or 9a. These condensers serve to insulate the separate bias voltages employed, and otherwise to permit the impedance between 8a and 14 to be substantially pure resistance, with negligible phase-angle. The inductance coil 8 is coupled with the resonant circuit, one terminal of 8 being connected to diode-anode 5, and the other terminal of 8 connected to the variable contactor 8a, upon resistance 9. At 22 is a bias-voltage source having its positive terminal connected to cathode 4. Resistance 9a is shunted across resistance 9 through the stopping condensers 10 and 10a, the condenser 10 being connected to one terminal of 9a and the condenser 10a being connected to the other terminal of 9a. Resistance 9 is connected to a negative potential upon 22 by variable contactor 14, and resistance 9a is connected to a negative potential upon 22 by variable contactor 35. Coupled with coil 25 is compensating inductance coil 17. The variable contactor 31a upon resistance 9a is connected to terminal 18, which is connected to terminal 19, directly through conductor 20, and terminal 19 is connected to control-grid 1, through compensating coil 17. For modulating the frequency of the stabilized-frequency oscillator, connection between terminals 18 and 19 is through source 21 as in Fig. 1, instead of through conductor 20. Degenerative voltages between 35 and 31a, which exist after a threshold value of alternating voltage determined by bias of 14 upon diode-anode 5, has been reached, are impressed upon control-grid 1. Also voltages upon 17 in quadrature phase with the anode-cathode alternating currents, of proper magnitude and polarity, are impressed upon control-grid 1, to adjust the oscillation-sustaining feed-back voltages to be in exact phase opposition to cathode-anode alternating currents, in order to to compensate variations of thermionic tube resistance, and variations of network resistance, and the effect of these variations upon the generated frequency. Suppressor-grid 7, is normally connected directly to cathode 4.

Referring to Fig. 3, at 6b is a thermionic tube having a cathode 4, anode 3, control-grid 1, and screen-grid 2. A resonant circuit consisting of coil 15 with resistance 15a is shunted by variable condenser 15b, and connected between the screen-grid 2 and the positive potential upon source 11 by connector 11a. A greater positive potential is connected upon the anode 3, through coil 16, which coil is coupled with 15. The negative terminal of source 11 is connected to cathode 4, and by-pass condensers 12 and 13, respectively by-pass the source 11 and the part of source 11 from 11a to cathode 4. At 22 is a bias-voltage source, with positive terminal connected to the cathode 4, and with a negative terminal connected by contactor 35 to control-grid 1, through terminals 19a and 18a. At 8b is an inductance coil, and at 8c upon 8b is a half-inductance point, the coil 8b being coupled inductively with 15. At 47 is a double-diode, having diode-cathode 4a with diode-anode 5a, and diode-cathode 4b with diode-anode 5b. Cathodes 4a and 4b are each connected to a common junction 9c through connections of negligible impedance. Connected to the junction 9c, is the positive terminal of bias-voltage source 22a, the resistance 32 being shunted across source 22a to form a potentiometer. Connected to the half-inductance point 8c is the variable contactor 14a upon resistance 32, one terminal of coil 8b being connected to diode-anode 5a, and the other terminal of 8b being connected to the diode-anode 5b. Anodes 5a, and 5b, are negatively biassed by the adjustable constant bias-voltage from 22a—32. When a selectable magnitude of oscillation-sustaining feed-back voltage upon 2—4 has been reached, coil 8b carries alternating currents, and the effective resistance of the circuit 15—15b—15a is increased, in relation to the threshold voltage determined by 22a—32—14a. The characteristic of oscillation-sustaining feed-back voltage in relation to cathode-anode alternating currents, is thus modified, after a selectable feed-back has been reached.

Referring to Fig. 4, connections are similar to Fig. 3, control-grid 1 however, being employed both for impressing compensating quadrature-phase voltages to supply fundamental frequency phase-balancing, and for impressing degenerative voltages derived from a transfer-impedance connected between the double-diode cathodes. Thus, connected between the diode-cathode 4a and junction 9c, is the resistance 9', and likewise connected between the diode-cathode 4b and the junction 9c, is the equal resistance 9''. Shunted across the cathodes 4a and 4b, is the resistance 9a, spanning between 4a and 4b, one terminal of resistance 9a being connected to 4a through stopping condenser 10, and the other terminal of 9a being connected to 4b through stopping condenser 10a. Control-grid 1 is connected from a negative terminal of bias 22 by contactor 35, contactor 35 being connected to a terminal of 9a, and 9a being connected by variable contactor 31a through terminals 18 and 19, and through compensating coil 17, to the control-grid 1. Connection between terminals 18 and 19, is through connection 20, or alternatively, through variable-voltage source 21 as previously described for Fig. 1 for modulating the stabilized frequency. In this usage, the resistances 9', 9'', and 9a, are high in relation to the diode resistance, per se, between 4a and 5a, or between 4b and 5b; the diode currents are thus very small, and the reaction of the diode circuit in the resonant circuit 15—15b—15a is negligible, only sufficient energy being taken from the resonant circuit to establish the degenerative control voltages required.

Referring to Fig. 5, a Hartley-type oscillator employing a triode is shown, employing also phase-balancing, and a single-diode, with transfer-impedance connected to diode, permitting different voltage-bias upon the diode and upon the grid. Tube 6c has the cathode 4, anode 3, control-grid 1, and diode-anode 5. The resonant circuit contains the coil 16a with resistance 16b, in series with the coil 15d with resistance 15e, and the variable condenser 16c shunted across these series-connected coils. The junction $y'$ of coils 16a and 15d, is connected through a high-reactance choke-coil 11b to the positive terminal of source 11, the negative terminal of source 11 being connected to cathode 4. The junction $h'$ between condenser 16c and coil 16a is connected to anode 3, and the junction $j'$ between condenser 16c and coil 15d is connected through compensating inductance coil 17 and stopping condenser 23 to control-grid 1. Shunted across the source 11 and choke-coil 11b in series, is the variable condenser 26 in series with the coil 25, the coil 25 being inductively coupled with coil 17. At 22 is a bias-voltage source, with positive terminal connected to cathode 4. At 8 is an inductance coil coupled with 16a—15d, one terminal of 8 being connected to diode-anode 5, the other terminal of 8 being connected to variable contactor 8a, upon resistance 9 of the transfer-impedance 8—10—9a—10a. One terminal of resistance 9 is connected through the variable contactor 14 to a negative terminal of 22; one terminal of resistance 9a is connected through variable contactor 35 to a negative terminal of 22, and the control-grid 1 is connected through leak-resistance 27 to variable contactor 31a upon resistance 9a. Degenerative voltages across 35—31a, serve to suppress the generation of disturbing harmonic amplitudes, and phase-balancing of the fundamental generated frequency is brought about through the voltage introduced into coil 17, to provide a high degree of frequency-stability, over a range of frequencies, the condensers 26 and 16c being simultaneously tuneable, as illustrated for example by dotted-line G' indicating a mechanical connection of rotors.

Referring to Fig. 10, a tuned-plate type oscillator employing a triode is shown, and utilizing a double-diode type voltage-control device, together with phase-balancing means. The voltage-control device is the same as in Fig. 4, the coil 8b being coupled with the resonant circuit 16a—16b—16d. The tube 6d has cathode 4, anode 3, and control-grid 1. One terminal of coil 16a is connected to the anode 3, the other terminal of coil 16a being connected to choke 11b which connects with the positive terminal of source 11. The negative terminal of source 11 is connected to cathode 4, and the coil 25 and variable condenser 26 in series, are shunted across choke 11b and source 11 in series. Control-grid 1 is connected through coil 17a, and through coil 15d, to an output-terminal 28b of the low-pass filter 28. The input-terminal 28a of filter 28 is connected by variable contactor 31a to resistance 9a of the transfer-impedance 9a—9'—9''—10—10a, and one terminal of resistance 9a is connected to a negative terminal of bias-voltage source 22, and to common output-input terminal 28c of the filter 28. Coil 15d is coupled with resonant circuit 16a—16b—16d for providing self-sustaining feed-back voltages, coil 17a is coupled with 25 for providing quadrature-component phase-balancing voltages, and harmonic suppressing degenerative voltages, are provided between terminals 28c—28a, and between 28c—28b. Condensers 26 and 16d can have a common rotor-shaft, for simultaneous tuning.

In Fig. 11, a variant is shown, with reference to Fig. 1, Fig. 2 or Fig. 4. In these figures, the control-grid is employed for both phase-balancing voltages and for threshold-controlled degenerative voltages, whereas in Fig. 11, the degenerative voltages are impressed upon the same grid employed for oscillation-sustaining feed-back voltages, leaving the control-grid free for the sole use of phase-balancing or phase-modification for frequency-modulation. Tube 6, has a cathode 4, anode 3, control-grid 1, screen-grid 2, and diode-anode 5. At 16a—16b—16d is a resonant circuit, the coil 16a with resistance 16b having one terminal connected to the anode 3, and the other terminal connected to a first terminal of the high-reactance choke 11b, the second terminal of the choke 11b being connected to the positive terminal of the source 11, the negative terminal of source 11 being connected to cathode 4. Bias-voltage source 22 has its positive terminal connected to cathode 4. The screen-grid 2 is connected through coil 15 to terminal k, and terminal k is connected through high-reactance choke-coil 11c to a positive potential upon 11, through connector 11a. Coil 8 is coupled with the resonant circuit 16a—16b—16c, as is also coil 15; one terminal of coil 8 is connected to diode-anode 5, and the other terminal of coil 8 is connected through resistance 9ab and variable contactor 14 to a negative terminal of bias-voltage source 22. At 30, is a ground connection. At 13a is a stopping condenser of negligible reactance, for keeping voltage of source 11 from the diode circuit, and permitting flow of alternating current from terminal k to resistance 9ab, through variable contactor 31b upon 9ab. Degenerative voltages from 9ab are thus introduced upon screen-grid 2, in series with feed-back voltages from coil 15. Coil 25 and condenser 26, in series, are shunted across choke 11b and source 11 in series, and control-grid 1 is connected through coil 17, terminals 19 and 18, to bias-voltage of negative polarity upon 22, by variable contactor 35. The compensating coil 17 is coupled with coil 25, and connections between terminals 18 and 19 are either direct, through connection 20 for frequency stabilization, or through the variable-voltage source 21 as in Fig. 1 for modulation of stabilized frequency.

Referring to Fig. 12, there is illustrated in partial block-diagram form a superheterodyne receiver, with one of the generators of this invention supplying a conventional form of mixer, and detail connections from a conventional frequency-demodulator and amplitude-demodulator to the terminals 18—19 of an oscillator of this invention, for automatically tuning a difference-frequency, commonly referred to as an intermediate frequency, when the tuned demodulator is approximately tuned to the difference-frequency or intermediate-frequency. At 61, is an oscillator such as previously described herein, for example Fig. 11. At 43 is a frequency-mixer, and at 44 is an amplifier for amplifying voltages having a resultant frequency different from the received frequencies upon antenna 42, the amplifier 44 being commonly referred to as the intermediate-frequency amplifier, and utilized for amplifying difference-frequencies resulting from the superposition of the received frequencies at 42 and the generated frequencies of 61, combined in the frequency-mixer 43. At 60 is a connection for coupling the network of generator 61 with the frequency-mixer, in a manner well understood. Within the enclosure 41, is shown a conventional form of demodulator for frequency-demodulation and for amplitude-demodulation. Output-voltages of intermediate-frequency from the amplifier 44 are impressed upon tube 49, for example, between control-grid 58 and ground 30. An anode-output circuit 48 is supplied with positive potential from a source such as 11, Fig. 11, through conductor 51, likewise a screen-grid of tube 49 is supplied with a lesser positive potential from said source 11, for example through conductor 50. At 46 is a tuneable circuit, coupled with 48. At 47b is a double-diode tube, with cathodes 55 and 56. Connected across the cathodes 55 and 56, are the equal resistances 21a and 21b, in series, the mid-resistance point 21c being connected through the high-reactance coil 52 to the mid-inductance point upon the anode-output circuit 46, the mid-inductance point being also coupled capacitively through condenser 52a to the anode of tube 49. In a manner well understood, amplitude-demodulation voltages are provided thereby, across resistance 21b, or 21a, and differential voltages between the extreme terminals 18a and 19a respectively of resistances 21b and 21a in series, responsive to deviations of the intermediate-frequency above or below a normal value, for which the tuneable circuit 46 is exactly tuned, and for which the differential voltage is zero. At 45 is a connection from resistance 21b to intermediate-frequency amplifier 44, for volume-control, and whereby bias-voltage upon thermionic tubes of the intermediate-frequency amplifier is modified to correct excessive volume, in a manner well understood. The anode-output circuit 48 is understood to be inductively coupled with tuneable circuit 46, and each of the two extremities of the tuneable circuit 46 to be connected to one of the diode-anodes of the double-diode 47b.

Such a receiving system commonly involves a considerable number of variable condensers, tuned by mechanical connection between them, with difficulties of exact alignment, and particularly in view of modification of output-volume by the volume-control. By means of a generator of this invention, terminals 18—19 can be employed to apply a self-correcting voltage, which modifies the generated frequency in proper direction, so that the intermediate-frequency or difference-frequency applied to the demodulator reduces the differential voltage across 18a—19a to substantially zero, at which intermediate-frequency the tuneable circuit 46 is exactly tuned. By means of the generators of this invention, this is accomplished with a single thermionic tube, without the necessity of a separate reactance-modulator tube and circuit.

The generators heretofore described are best adapted to use in the high or radio-frequency range, as distinguished from an audible or super-audible range of frequencies. The principles of this invention for securing a high degree of frequency-stability of generated frequencies, independent of thermionic tube variations, and combining the action of phase-balancing and harmonic suppression by the voltage-control device, are also applicable in the important range of audible and super-audible frequencies, as illustrated in Fig. 13 and Fig. 15. Fig. 13 illustrates a resistance-capacitance type oscillator having a novel phase-balancing means for the fundamental generated frequency, and Fig. 15 illustrates the same oscillator of Fig. 13 with both fundamental-frequency phase-balancing means and voltage-control device means for suppressing harmonics, to secure a maximum degree of effectiveness of the phase-balancing. Referring to Fig. 13, at 6b' is a thermionic tube having cathode 4, anode 3, control-grid 1, and screen-grid 2, and having a continuous-voltage source 11 with negative terminal connected to cathode 4, and a bias-voltage source 22 with positive terminal thereof connected to cathode 4. Screen-grid 2 is connected by conductor 11a to a terminal of positive voltage upon source 11. Connected between the positive terminal d of the source 11 and the anode 3 is the resistance $r_0$, and coupled with $r_0$ through the stopping condensers $C_1$ and $C_2$, is the recurrent-section resistance-capacitance network between the input terminals P—P' and output terminals Q—Q'. Each section of this network consists of a resistance for the series element, designated by $z_1$, and a capacitance designated by $z_2$ for the shunt element, and connected to the midpoint of resistance $z_1$, so that each section forms a T, with $z_1/2$ on either side of the shunt element $z_2$. Connected between the output terminals Q—Q' is an output-impedance consisting of a two-branch parallel circuit, one branch having the terminal resistance $r_t$, and the other branch having the condenser $C_t$ in series with a compensating or phase-balancing resistance $17c$. Connected from the terminal Q, is the control-grid 1, and connected from a negative terminal upon bias-voltage source 22 through variable contactor 35, is the junction e between condenser $C_t$ and phase-balancing resistance $17c$.

The resistances $z_1$ of the sections, as well as the resistance $r_t$ and the phase-balancing resistance $17c$, are all variable, for example by means of rotors such as H, the rotors being mechanically connected together, for example by connector G, in a manner well understood. By this means, the required phase-shift for self-sustained oscillations can be produced, over a range of frequencies. The stopping condensers $C_1$ and $C_2$ are understood to have large capacitance, and negligible reactance in relation to $z_1$ and $z_2$.

The principles of operation of the compensating or phase-balancing resistance $17c$, can best be understood by reference to certain well known facts concerning such phase-shifting structures, and to the vector-diagram, Fig. 14. The characteristic impedance of a line of an infinite number of such sections, and from the input terminals P—P', is designated by $Z_k$, and from the well-known principles of such structures, (1) $\quad Z_k = \sqrt{Z_1 Z_2 (1 + Z_1/4Z_2)}$ a complex number, wherein $Z_1$ is the resistance of element $z_1$ and $Z_2$ the reactance of element $z_2$, that is $Z_2 = -j/\omega C$, where $$j = \sqrt{-1}$$

and $\omega = 2\pi \times$ frequency. This complex number can also be designated in the following manner:

(2) $\quad Z_k = R_k - jX_k$ wherein $R_k$ and $X_k$ are determined from (1), C being the capacitance of element $z_2$.

The terminal impedance, between terminals Q—Q', is determined to be always equal to $Z_k$, by adjustment of $r_t$ in relation to $C_t$; the line is thus non-reflective at Q—Q', the terminal impedance replacing the balance of an infinite line. The initial current through the terminals P and P' is designated by $I_0$, and the terminal current through the terminals Q and Q' by $I_t$; the relation between terminal current and initial current is then:

(3) $\quad I_t = I_0 e - NP$ where N is the number of T-sections referred to,

P the propagation factor per section, a complex number involving the phase-shift per section and the attenuation per section, and $e$ is the Naperian base, 2.7183, the propagation factor being readily determinable from the impedances, by the well-known relation:

(4) $$\sinh P/2 = 1/2\sqrt{Z_1/Z_2}$$

The initial current $I_0$, thus leads the voltage across P—P' by the phase angle $\theta_k$, where $\tan\theta_k = X_k/R_k$, as indicated in Fig. 14, in which the direction of vector rotation is counterclockwise about 0'. Without the presence of any phase-compensating resistance at 17c, it will be noted that for a particular frequency, and in relation to $z_1$ and $z_2$, an additional phase-shift per section of $$\beta = \frac{\pi - \theta_k}{N}$$

can be obtained, that is a total phase shift through the network of $\pi - \theta_k$, so that the voltage across Q—Q' will be in exact phase-opposition with the current $I_0$. It will also be noted, that the oscillator cannot operate in an equilibrium condition with the phase-shift indicated, and further, that whatever phase-shift does exist at the equilibrium condition of the oscillator, will be modified by changes in cathode-anode conductance of the thermionic tube, giving rise to the undesired frequency-instability. This will be apparent from the following considerations. If $r_p$ is the resultant cathode-anode resistance, made up of the actual thermionic cathode-anode resistance in parallel with $r_0$, and $\mu'$ the resultant amplification factor, then for the equilibrium condition of the oscillator, $\mu' E_T$ must be a vector-voltage equal in magnitude and opposite in phase to the vector sum of voltages $E_0$ and $I_0 r_p$, where $E_T$ is the terminal voltage across Q—Q', $E_0$ the voltage across P—P', and $I_0 r_p$ the cathode-anode voltage drop. This vector sum, will be along a line somewhere intermediate between $E_0$ and $I_0 r_p$, and $E_T$ will have to have an upward component, to compensate the downward component $I_0 X_k$ of $E_0$. Also, when this particular equilibrium is determined, and the oscillator runs at the requisite frequency for this equilibrium, it is apparent that any change in cathode-anode tube resistance will upset this balance, and generate a new frequency.

To avoid this condition the compensating resistance 17c is provided. By this means a quadrature-component of voltage $E_T'$ is provided upon the control-grid 1, in quadrature with $E_T$, and in such magnitude and polarity as to compensate for the quadrature component of voltage of $E_0$, that is the reactive-component of voltage occasioned by the cathode-anode alternating current flowing through the characteristic impedance, and indicated by $I_0 X_k$. The resistance employed at 17c is small in relation to the reactance of condenser $C_t$, so that the current through 17c is determined in magnitude and phase by the reactance of $C_t$ and the terminal voltage $E_T$. It will be noted that the summation of voltages upon the control grid takes place in the sequence $e$—17c—Q'—$r_t$—Q—1, and that resistance 17c can be adjusted in relation to the resultant amplification factor $\mu'$, to $C_t$, and to the parameters $Z_1$ and $Z_2$ determining characteristic impedance, phase shift, and attenuation, so that $I_0 X_k$ will be separately compensated, for all operating frequencies; under these conditions the voltage $E_T$ when amplified, need only sustain the arithmetic sum of $I_0 R_k$ and $I_0 r_p$, and any change in magnitude of the tube resistance changing $r_p$ can have no effect upon the magnitude of generated frequency, so long as a single, simple-harmonic generated frequency is concerned.

It is therefore evident, with the compensation or phase-balancing of this oscillator, as with the other oscillators herein disclosed, that a maximum effectiveness of the phase-balancing can only be utilized when the generated frequency is substantially limited to a single frequency constituent in the generated alternating currents. Fig. 15 illustrates how this is accomplished for the oscillator of Fig. 13, employing the voltage-control device of this invention. The phase-shifting network is identical with Fig. 13, also the connections to the thermionic tube, however, the connections from bias-source 22 to control-grid 1, include connections with the resistance 8a, of the transfer-impedance. Coupled with the resistance $r_0$, are the equal resistances 8d and 8e connected in series, and having the common junction 8j, a terminal of 8d being connected to one terminal of $r_0$ through condenser $C_3$, and a terminal of 8e being connected to the other terminal $r_0$ through condenser $C_4$. The double-diode 47 has diode-anode 5b connected to a terminal of 8d opposite common junction 8j, and diode-anode 5a connected to a terminal of 8e opposite common junction 8j. Cathodes 4a and 4b are interconnected by the transfer-impedance 9'—9''—10a—9a—10 previously described, a positive terminal of bias-voltage source 22a being connected to junction 9c between 9' and 9'', and a negative terminal of 22a being connected through variable contactor 14a to the junction 8j. The terminal $e$ of the compensating resistance 17c, is connected through variable contactor 31a to resistance 9a, and a terminal of 9a is connected to a negative terminal of bias-voltage source 22 through variable contactor 35, to apply threshold-determined degenerative voltages upon control-grid 1, in addition to quadrature-component compensating voltages from 17c, and oscillation-sustaining feed-back voltages from Q—Q'. The thermionic tube illustrated for Fig. 15, at 6e, has a suppressor element 7 connected to cathode 4; connections of other elements are identical with Fig. 13. Condensers $C_3$ and $C_4$, are large capacity stopping-condensers, and have negligible reactance in relation to the resistances 8d and 8e.

Referring to Fig. 16 and Fig. 17, at 75 and 76 are input-terminals for applying alternating voltage to the input-impedance 15g—15k. Coupled with the inductance coil 15k is the coil 8b, one terminal of 8b being connected to terminal 70, the other terminal of 8b being connected to terminal 72, and the mid-inductance point 8c of 8b being connected to terminal 71. A double-diode 47, with transfer-impedance, and bias-voltage connection, as previously described, is connected to terminals 70, 71, and 72, terminal 70 being connected to diode-anode 5a, terminal 72 to diode-anode 5b, terminal 71 to a negative terminal of bias-voltage source 22a, and the positive terminal of 22a connected to the junction 9c between 9' and 9'', upon the transfer-impedance 9'—9''—10a—9a—10 interconnecting the cathodes 4a and 4b. Terminal 73 is connected directly to the cathode 4a, and terminal 74 is connected directly to cathode 4b, resistances 9' and 9'' of the transfer-impedance being connected in series between 73 and 74. The dotted-line control-device enclosure designated by 90, includes the terminals 70, 71, 72, 73 and 74, and the above-described connections thereto of double-diode 47, bias-voltage source 22a, and resistances 9' and 9''; for simplicity of illustration these connections are referred to in Fig. 17 and Fig. 20 as the control-device 99. Referring in particular to Fig. 17, and to Fig. 18, the various relationships of resultant voltage at the terminals 85'—86' obtainable from impressed voltages upon 75—76, will be apparent. The relative phase of the threshold-determined voltages upon 9a combined with the voltages from 75—76, is controllable by the variable-contactors 31a and 35 upon 9a; the characteristic indicated at A, Fig. 18, shows the resultant voltage across 85'—86' when the contactors 31a and 35 are coincident upon the same point upon 9a, and no voltage is combined from 9a. When voltages are introduced at 9a, by separation of 31a and 35 so as to have phase-aiding or regenerative components, the resultant characteristic is rotated in a direction indicated by arrow 83, for example along a characteristic such as B, and with reference to the threshold voltage at $q'$; when the separation at 31a and 35 is of opposite order in reference to path traversed through 9a, then the voltages introduced from 9a are phase-opposing or degenerative, and the resultant characteristic is rotated in a direction indicated by arrow 84, for example along characteristics such as C, D, or F, with reference to threshold voltage at $q'$. A high degree of waveform control is thus provided, and in particular when large magnitudes of opposing voltage are employed in relation to the magnitude of impressed voltage. For example, with the characteristic D, after the threshold value of voltage $q'$ is reached, increments of impressed voltage are opposed by equal increments of voltage from 9a, and the resultant voltage at 86'—85' is constant as to maximum value, independent of greater voltages impressed at 75—76. By this means, trapezoidal-type waves can be generated, as indicated at 81, Fig. 19, and also rectangular-type waves, by employing sufficiently small threshold-voltage in relation to maximum voltage of the impressed signals at 75—76. Modification of harmonic constituents, is considered in further detail hereinafter, and with reference to certain quantitative relations. The device illustrated at 99, Fig. 17 and Fig. 20, is understood to contain a double-diode 47, bias-voltage source 22a, and connections between terminals 70, 71, 72, 73 and 74, identical with those described for Fig. 16.

In Fig. 17, a thermionic tube 6d, having cathode 4, anode 3, control-grid 1, and output-impedance Z connected between anode 3 and positive terminal of source 11 is shown, the resultant voltage between terminals 86' and 85' being directly applied to the control-grid 1, from a negative terminal of the bias-voltage source 22, for controlling thermionic currents through Z.

In Fig. 16, thermionic tube 6b has cathode 4, anode 3, control-grid 1, screen-grid 2, and output-impedance Z connected between anode 3 and a positive terminal of continuous voltage source 11. Modification of thermionic currents is effected by applying the impressed voltage of terminals 75—76 directly to the screen-grid 2, through a connection 11a to source 11, of positive potential less than applied to the anode, and by applying the voltage of 31a—35 to the control-grid 1, from a negative terminal of bias-voltage source 22.

Referring to Fig. 20, a device is illustrated for generating irregular-shape waves, such as rectangular and saw-tooth waves, from a generator of this invention, so as to have a high degree of frequency-stability, and employing a voltage-control device of this invention for double-duty, as a harmonic suppressor for the phase-balanced oscillator employed, and as a wave-form control for a second thermionic tube supplied with stabilized-frequency voltage from the oscillator. At 90 is shown part of the double-diode voltage-control device, previously described, and for example as connected to the oscillator of Fig. 4, with reference to the coupling of coil 8b with resonant circuit 15—15a—15b, and the connections 35 and 31a. At 6b' is a thermionic tube with cathode 4', anode 3', control-grid 1', screen-grid 2' and output-impedance Z' in series with Z'', connected between anode 3' and the positive terminal of continuous voltage source 11. A condenser 87 is shunted across the terminals 77—88' of Z', the condenser being variable, and 78 is a terminal of Z'' connected to the positive terminal of source 11.

Screen-grid 2' is connected, for example, directly to terminal 86, Fig. 4, that is to screen-grid 2, Fig. 4. Stabilized-frequency is impressed upon screen-grid 2', and by means of the variable contactor 31d upon 9a connection is made to control-grid 1', for wave-form control. For example, when the variable-contactor 31d is adjusted for applying opposing voltages to 1' in excess of a threshold magnitude, rectangular current waves are produced through the cathode-anode circuit 4'—3'; if Z' is a variable resistance, and Z'' also a variable resistance, then a rectangular voltage wave is produced across the terminals 78—88' of Z'', and an isoceles-triangle type sawtooth wave is produced across the terminals 77—88'. These waves are illustrated respectively in Fig. 19, part (II), at 81 and 88. The total voltage across 77—88 is a saw-tooth wave indicated by 87', and the successive right-triangle type saw-tooth wave can be produced from 87', as shown at 87'', by inverting alternate waves through rectifier means, in a manner well understood. It will be understood, that portions of such saw-tooth waves are in fact portions of exponential transient changes, and that such portions can be made to approach straight-line changes with time, by employing a sufficiently small portion of such transient characteristics.

Having described the principal structures of this invention, certain important features of operation of the devices will be apparent from the following considerations. Referring to Fig. 6 and Fig. 7, graphs are shown, illustrating equilibrium currents in the cathode-anode circuit of conventional oscillators, and Fig. 7 illustrating control of the equilibrium current by the devices of this invention. Relative to origin O, ordinates indicate the effective value of cathode-anode alternating current, designated by $i_p$, and abscissas indicate effective value of a grid voltage, $e_g$, either required to produce $i_p$, or available upon the phase-shifting network when the current $i_p$ is produced by separate excitation of the grid. For example, 36 illustrates a relationship between current $i_p$ and grid voltage $e_g$ for a separately excited thermionic tube with a phase-shifting network connected between cathode and anode, and 37 illustrates corresponding voltages available across the part of such network which would normally be connected to the grid when employed as an oscillator, and for any particular current $i_p$. At $p$ is an equilibrium point, at which the voltage required to produce the current $i_p$ is exactly equal to the voltage available for feed-back, at $i_p$. For currents less than that indicated at $p$, the available voltage for feed-back is greater than required, and for currents greater than indicated at $p$, the available voltage for feed-back is less than required. Equilibrium attained in this manner in conventional types of oscillators, commonly involves large voltage swings, and operation employing the dotted portions of the characteristic, upon which cathode-anode current is modified by cut-off, for portions of a cycle, and substantial curvatures are traversed upon the tube characteristics; the resultant alternating currents thus contain numerous harmonic frequencies. Referring to Fig. 6, there is illustrated the effect of certain methods hitherto employed for constraining the equilibrium operating point to a more favorable position upon the characteristics, for example at $p'$, by moving the characteristics relatively away from each other, as indicated by the arrows 36a and 37a. For example, diodes have been used to establish a current-created steady-voltage negative bias upon a grid, increasing with increase in voltage swings, and thus reducing the amplification factor of the tube, and decreasing the initial slope of curve 36. Certain important disadvantages of this method for use with frequency-stabilization devices, have been previously noted herein. It will also be noted that for positive operation, in building up to the equilibrium current, the available feed-back voltage must be definitely greater than the voltage required for any current $i_p$, below the equilibrium current; for example as indicated by the marginal amount $u$—$v$, at the particular current indicated by the line $b$. Thus, some residual curvature must be retained by this method, which is limited by the fact that both characteristics in the range desired, are substantially straight lines from the same origin, O.

Fig. 7 illustrates the principles of this invention, applied to a thermionic oscillator, and shows the utilization of a virtual-origin for instantaneous threshold-determined degenerative voltages, for controlling the feed-back characteristic, without the necessity of modifying the dynamic characteristic, and without introducing the disadvantages attendant upon modification of tube parameters. At $q$, is shown a virtual origin, determined by the selective voltage of the constant bias, negatively biassing the anode or anodes, of the diode of the voltage-control device. At 38 is indicated the degenerative voltage $e_g'$ for any current $i_p$, the resultant feed-back characteristic being shown by O—$q$—$p'$. It will thus be seen that by selective control of the constant negative bias voltage upon the diodes 4—5, or 47, and by selective control of the amount of degenerative feed-back voltage, the equilibrium point $p'$ of the oscillator can be readily controlled, and the oscillator constrained to operate in the range of grid voltages desired. By this means an ordinary feed-back characteristic, such as O—$q$—$p$, is modified to O—$q$—$p'$—40.

Referring to Fig. 8, and Fig. 9, at 64 is shown a sinusoidal voltage wave, the horizontal axis being proportional to elapsed time; at $e_a$ is shown an instantaneous value of voltage, at $E_a$ the maximum value, and at 63 an opposing bias voltage, of magnitude $E_b$. At 65 is shown voltage waves resulting from rectification of a wave such as 64, with negative bias such as 63; the waves 65 resulting from a single diode, and waves 65 and 66 resulting from double-diode rectification. At $e_a'$ is shown an instantaneous value of such rectified voltage.

In order to aid in visualizing modifications in voltage effected by the voltage-control device, with reference to employment of the device as disclosed in Figs. 16, 17, and 18, and in particular with reference to the oscillators of this invention, wherein a relatively small percentage diode-bias voltage can be employed, and a relatively small percentage of resultant rectified voltage can be employed for degenerative feed-back, the following quantitative relations are noted, it being understood that these relations are not to be construed as any manner of limitation upon the employment of the structures herein described, or otherwise than to facilitate a better understanding of the principles employed to stabilize the generated frequency, in oscillators such as previously described.

Designating the fractional part of the maximum voltage $E_a$ which is employed for constant negative bias-voltage upon the diode or diodes of the voltage-control device by $1/\gamma$, then $$E_b = E_a/\gamma$$

The rectangular bias-voltage 63, Fig. 8, opposing the voltage 64, expressed in terms of the well-known Fourier's series expansion is:

$$\frac{4E_a}{\pi\gamma}\left(\sin \omega_1 t + \frac{1}{3}\sin \omega_3 t + \frac{1}{5}\sin \omega_5 t + \ldots \frac{1}{n}\sin \omega_n t\right)$$

in which $t$ is elapsed time, and $\omega_n = 2\pi x F_n$, $n$ being the order of odd harmonic, and $F_n$ the frequency corresponding to the $n$th odd harmonic. The impressed voltage upon the diodes is:

$$e_a = E_a \sin \omega_1 t$$

The resultant voltage, 65, 66 is thus:

$$E_a\left[\left(1-\frac{4}{\pi\gamma}\right)\sin \omega_1 t - \frac{4}{\pi\gamma}\left(\frac{1}{3}\sin \omega_3 t + \ldots \frac{1}{n}\sin \omega_n t\right)\right]$$

and when a fraction defined by $1/\rho$ of this resultant voltage is degeneratively combined with a voltage, such as 64, the resultant voltage is:

$$e_a'' = E_a\left[\left(1-\frac{1}{\rho}+\frac{4}{\pi\rho\gamma}\right)\sin \omega_1 t + \frac{4}{\pi\rho\gamma}\left(\frac{1}{3}\sin \omega_3 t + \ldots \frac{1}{n}\sin \omega_n t\right)\right]$$

An estimate of the harmonic constituents, with particular reference to the large reduction in harmonic content of the feed-back voltage, when the ratios $1/\gamma$ and $1/\rho$ are small fractions, for frequency stabilization purposes, is readily obtained by comparison of the amplitude of $n$th harmonic present with the amplitude of the fundamental. Thus the ratio of amplitude of $n$th odd harmonic to fundamental amplitude is:

$$\frac{1}{n} \times \frac{1}{\frac{\pi}{4}\left(\rho\gamma - \gamma + \frac{4}{\pi}\right)}$$

As employed in its fullest scope, as described with reference to Fig. 18, for generation and control of wave-form of irregular waves, the degenerative voltage of the voltage-control device can be equal to, or greater than, corresponding increments of impressed voltages, beyond the threshold value, as in characteristics D or F, respectively; Fig. 19, part (I) for example, illustrates at 82 degenerative voltages equal to the excess of impressed voltages 80, above a negative bias-voltage such as 81. It will be evident that coupling between the diode 47 and source of impressed alternating voltages, for example between coil 8b and 15k—15g, Fig. 16 or Fig. 17, can be such as to impress upon 8b greater voltages than are present upon 15k—15g.

For simplicity of illustration, bias-voltages have in each instance been shown with reference to a battery-source. It will be evident that other well-known source-means for negative bias can be employed, for example utilization of voltage-drop caused by flow of steady-component of cathode-anode current through a resistance, connected to a cathode, for example to cathode 4.

Having described several illustrative embodiments of my invention, it will be evident that changes can be made in the form and arrangement of parts, and by substitution in part of other well-known structures, without departing from the spirit of my invention, as set forth in the appended claims, and I do not therefore limit the scope of the invention to such particular embodiments, or otherwise than by the terms of the appended claims.

What is claimed is:

1. In a thermionic alternating current generator having a thermionic tube, and a phase-shifting network with an alternating current input-circuit connected between a cathode of said tube and an anode of said tube, and with an output-circuit connected to said cathode through a connection of substantially zero impedance, providing oscillation-sustaining alternating feedback voltages, a harmonic suppressor device for limiting the wave form of the generated alternating currents to contain substantially only amplitude variations of a single frequency, said device comprising a constant-voltage bias means, a thermionic diode means having a diode-anode and a diode-cathode, and a coupling means coupled with said phase-shifting network, said means being serially connected and forming a closed conductive circuit; a first terminal of said coupling means being connected to said diode-anode, a second terminal of said coupling means being connected to a negative terminal of said bias means, and the positive terminal of said bias means being connected to said diode-cathode, said voltage bias means negatively biasing said diode-anode from diode-cathode.

2. In combination with the structure of claim 1, impedance means connected in series with said serially connected means, carrying the total current passing through said diode means, comprising substantially pure resistance to said single-frequency, and to harmonic frequencies of said single frequency, for providing voltages thereon synchronous with, and without substantial phase displacement from the alternating voltages in said coupling means, and a connection from a grid-element of said thermionic tube to said cathode of said thermionic tube, including a degenerative-coupling with said impedance means, for impressing upon said grid-element said synchronous voltages in substantial phase opposition to said oscillation-sustaining alternating feed-back voltages, only when a selectable limit of alternating current in said input-circuit has been reached.

3. The combination with a thermionic alternating current generator, having a thermionic tube, a phase-shifting network with an alternating current input-circuit connected between a cathode and an anode of said tube, and with an output-circuit connected to said cathode through a connection of substantially zero impedance providing oscillation-sustaining feed-back voltages, and a fundamental-frequency quadrature phase feed-back voltage means for regulating phase of resultant voltage impressed upon said anode-cathode circuit, of a frequency limiting device, for limiting the wave form of the generated alternating currents to a sine-wave of said fundamental frequency, said device having a closed conductive circuit comprising the series connection of a constant-voltage bias means, a thermionic-diode means having a diode-cathode and a diode-anode, a coupling means coupled with said phase-shifting network, and an impedance means capable of carrying the total current passing through said diode means, comprising substantially pure resistance to said fundamental frequency and to harmonics of said fundamental frequency, for providing thereon synchronous voltages of substantially equal phase to the cathode-anode alternating currents of said generator, and a conductive connection from a grid of said thermionic tube to said cathode of said thermionic tube including a degenerative coupling with said impedance means; a first terminal of said coupling means being connected to said diode-anode, a second terminal of said coupling means being connected to a negative terminal of said bias means, and the positive terminal of said bias means being connected to said diode-cathode, for negatively biasing said diode-anode from said diode-cathode.

4. The combination with a thermionic alternating current generator, having a thermionic tube, a phase-shifting network with an alternating current input-circuit connected between a cathode of said tube and an anode of said tube, and with an output-circuit connected to said cathode through a connection of substantially zero impedance, and a fundamental-frequency quadrature-voltage feed-back means for compensating undesired phase-shift of resultant voltage in said anode-cathode circuit, produced by variations of thermionic resistance between said cathode and said anode, and by variations of resistance of said network, of a frequency-limiting device for limiting wave-form of the generated alternating currents to a sine-wave of said fundamental frequency, said device having a closed conductive circuit comprising the series connection of a constant-voltage bias means, a thermionic diode-means having a diode-cathode and a diode-anode, a coupling means coupled with said phase-shifting network, and an impedance means carrying the total current through said diode means, comprising substantially pure resistance for said fundamental frequency, and for harmonics of said frequency; a conductive connection from a grid of said thermionic tube to said cathode of said thermionic tube including a degenerative coupling with said impedance means, a first terminal of said coupling means being connected to said diode-anode, a second terminal of said coupling means being connected to a negative terminal of said bias means, and the positive terminal of said bias means being connected to said diode-cathode, for positively biasing said diode-cathode from said diode-anode.

5. The frequency control system, having a thermionic oscillator comprising a thermionic tube with a cathode, an anode, a first control-grid adjacent said cathode, and a second control-grid between said first control-grid and said anode for screening said first control-grid from undesired capacitive currents normally inherent with changes of voltage between said first control-grid and said anode, a tuned phase-shifting network for determining the fundamental frequency of said oscillator, having an alternating voltage input-circuit connected between said cathode and anode, and an alternating voltage output-circuit connected between said cathode and said second control-grid impressing opposite-phase voltages upon said second control-grid relative to said anode voltages, impedance means coupled with said network for conveying therefrom quadrature-phase voltages, a conductive connection between said first control-grid and said cathode serially including connections with said impedance means and with a bias-voltage control means for controlling negative bias of said first control-grid, and a source of unidirectional supply voltage with a positive terminal connected to said second control-grid and to said anode, whereby undesired extraneous detuning of said phase-shifting network through bias-voltage variation of said capacitive currents is eliminated, and whereby desired control of said frequency is effected entirely by said quadrature-phase voltages without pre-amplification of said quadrature-phase voltages.

6. In combination with the structure of claim 5, a harmonic-amplitude eliminating device for substantially eliminating amplitudes of harmonic frequencies of said fundamental frequency, said device having a closed conductive circuit comprising the series connection of a constant-voltage bias means, a thermionic diode means including said cathode with a diode-anode, a coupling means coupled with said phase-shifting network for providing voltages of like phase with currents through said anode, and a second impedance means carrying the total current from said diode means, comprising substantially pure resistance for said fundamental and harmonic frequencies; said circuit between said first control-grid and said cathode including a coupling with said second impedance means transferring to said first control-grid oscillation opposing voltages, and said closed conductive circuit having a first terminal of said coupling means connected to said diode-anode, a second terminal of said coupling means connected to a negative terminal of said constant-voltage bias means, and the positive terminal of said constant-voltage bias means connected to said cathode, positively biasing said diode-cathode from said diode-anode and providing a threshold-control of said transferred voltages.

7. A voltage limiting device for limiting alternating voltages to a selectable magnitude, said device comprising a first impedance for applying said alternating voltages, a thermionic regulator means comprising a thermionic double-diode with a first diode-cathode and first diode-anode, and with a second diode-cathode and second diode-anode, a constant-voltage bias limiting means, a coupling means coupled with said first impedance, having a first terminal connected to said first diode-anode, a second terminal connected to said second diode-anode, and a third terminal connected to a negative terminal of said bias means, a second impedance connected between said first diode-cathode and said second diode-cathode, comprising substantially pure resistance at the fundamental and harmonic frequencies of said alternating voltages, and a connection from the positive terminal of said bias means to said second impedance, and a second coupling means between said first and second impedances for jointly applying alternating voltage from said first impedance and bias-limited alternating voltage from said second impedance.

8. In combination with the structure of claim 7, a thermionic tube having a cathode, an anode, and grid means for controlling thermionic currents between said cathode and said anode, a third impedance connected between said anode and said cathode, a continuous voltage source connected with said anode, and the connections between said grid means and said cathode including a connection with said first impedance and a connection with said second impedance, controlling said thermionic currents differentially, by alternating voltage from said first impedance and by said bias-limited alternating voltage from said second impedance, for limiting thermionic alternating currents through said third impedance.

9. A resistance-capacitance thermionic alternating current generator having a thermionic tube with a cathode, an anode, and grid-control means for controlling thermionic currents between said cathode and said anode, an input-resistance connected between said cathode and anode, a continuous voltage source connected to said anode, a recurrent-section resistance-capacitance phase-shifting network connected to said input-resistance, having a characteristic input-impedance, and having the capability of producing a total phase-shift of output alternating voltage relative to input alternating current of 180 degrees, an output-impedance connected to the output-end of said phase-shifting network, equal at each frequency to said characteristic impedance at said frequency, a thermionic current-limiting means limiting alternating currents in said cathode-anode circuit, a compensating-impedance coupled with said output-impedance, for providing a component of alternating voltage in quadrature-phase with the alternating output-voltage across said output-impedance, to compensate the quadrature-phase component of alternating voltage in said cathode-anode circuit established by cathode-anode alternating currents through said characteristic impedance, and connections from said grid-control means to said cathode including connections with said output-impedance and with said compensating-impedance.

10. In combination with the structure of claim 9, means for selectively controlling the generated frequency of said generator, including the simultaneous modification of resistances of said recurrent-sections, said output-impedance, and said compensating-impedance, and the mechanical connection of rotor-members controlling said resistances, whereby a selective frequency generator is provided, having a high degree of frequency stability substantially independent of variations of thermionic resistance of said tube, and free from substantial harmonic amplitudes of said selected frequency.

11. An electronic wave-form control device, for controlling wave-form of alternating voltages, said device comprising an input-impedance for applying alternating voltages, a coupling-impedance coupled with said input-impedance, having a first terminal, a second terminal, and a half-impedance terminal, a constant-voltage bias means, a thermionic double-diode having a first diode-cathode and a first diode-anode, and a second diode-cathode and second diode-anode, a transfer-impedance connected between said diode-cathodes, comprising a first resistance connected between said diode-cathodes, with a second resistance having one terminal thereof connected to said first diode-cathode through a first condenser, and having the other terminal thereof connected to said second diode-cathode through a second condenser, said first and second condensers having infinitesimal impedance in relation to said first and second resistances; said first terminal of said coupling-impedance being connected to said first diode-anode, said second terminal of said coupling-impedance being connected to said second diode-anode, a connection from a negative terminal upon said constant-voltage bias means to said half-impedance terminal, a connection from the positive terminal of said constant-voltage bias means to the half-resistance point upon said first resistance, and circuit connections, including a connection between said second resistance and said input-impedance, jointly applying voltages from said second resistance and from said input-impedance.

12. In combination with the structure of claim 11, a thermionic alternating current generator having a thermionic tube with a grid-control element, and having a phase-shifting network including said input-impedance, said circuit connections including a connection with said grid-control element.

13. In combination with the structure of claim 11, a thermionic alternating current generator having a first thermionic tube with grid-control means, and with a phase-shifting network, and a second thermionic tube with grid-control means, said phase-shifting network including said input-impedance, said circuit connections including connections with the grid-control means of said first thermionic tube; and connections with the grid-control means of said second thermionic tube, including connections with said phase-shifting network and with said second resistance, whereby stabilized-frequency voltages are produced, and the wave-form of said voltages controlled.

14. A control-device for controlling the magnitude and form of electrical impulses, said device having an input-impedance for applying said impulses, a thermionic regulator means, and an impulse combining means, said regulator means including a transfer-impedance having a first terminal, a second terminal, a resistance interconnecting said terminals, and a third terminal at the half-resistance point upon said resistance, a voltage bias means having one terminal connected to said third terminal, a first conductive circuit from the other terminal of said bias means to said first terminal including a first diode rectifying means having a first diode-anode, a second conductive circuit from said other terminal of said bias means to said second terminal including a second diode rectifying means having a second diode-anode, said first conductive circuit including a first coupling-impedance coupled with said input-impedance, said second conductive circuit including a second coupling-impedance coupled with said input-impedance, and said bias means applying negative potential to said diode-anodes for biasing said rectifying means, and said impulse combining means including a common conductive connection between said input-impedance and said transfer-impedance.

15. In combination with the structure of claim 5, a diode-modulator device for modulating the amplitudes of the cathode-anode alternating currents, said device having a closed conductive circuit serially including a second bias-voltage control means, a transfer-impedance, a thermionic diode with a diode-cathode and a diode-anode, and a coupling means coupling said closed circuit with said phase-shifting network, said second bias control means controlling the amount of negative bias of said diode-anode from said diode-cathode, and said conductive connection including a circuit through said transfer-impedance, for threshold control of feedback-voltages of opposite phase to said cathode-anode alternating currents.

16. The combination with a thermionic amplifier of a current-limiting device for limiting the amplitudes of cathode-anode alternating currents, said amplifier having a thermionic tube with a cathode, an anode, and a grid for controlling thermionic currents between said anode and said cathode, a conductive input-impedance connected between said grid and said cathode, and an output-impedance connected between said anode and said cathode, said current-limiting device comprising a closed conductive circuit serially including a diode-anode with said cathode, a constant bias-voltage source, a transfer-impedance, and a coupling means coupled with said output-impedance, said bias-voltage negatively biasing said diode-anode from said cathode, and a second coupling means coupled with said transfer-impedance, connected in series with said input-impedance between said grid and said cathode, for transferring alternating voltages from said transfer-impedance to said grid.

17. A control-device for controlling the magnitude and shape of cathode-anode current impulses, in a thermionic tube having a cathode, an anode, and a grid for controlling thermionic currents between said anode and said cathode, said control-device having a conductive input-impedance for applying voltage impulses, a thermionic voltage-regulator comprising a closed conductive series circuit every part of which is conductive, said circuit having the series connection of a constant bias-voltage means, a thermionic diode means with a diode-anode and diode-cathode, a transfer-impedance, and a coupling means for coupling said diode means with said input-impedance, said bias-voltage means being connected to negatively bias said diode-anode from said diode-cathode; and conductive circuit connections from said grid to said cathode including a conductive circuit through said input-impedance and said transfer-impedance in series, for jointly applying to said grid the impulse-voltages upon said input-impedance and upon said transfer-impedance.

EDWARD H. LANGE.